(12) United States Patent
Son et al.

(10) Patent No.: US 11,887,269 B2
(45) Date of Patent: Jan. 30, 2024

(54) COMPUTING METHOD AND APPARATUS WITH IMAGE GENERATION

(71) Applicant: Samsung Electronics Co., Ltd., Suwon-si (KR)

(72) Inventors: Minjung Son, Suwon-si (KR); Hyun Sung Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 17/202,899

(22) Filed: Mar. 16, 2021

(65) Prior Publication Data

US 2022/0148127 A1 May 12, 2022

(30) Foreign Application Priority Data

Nov. 11, 2020 (KR) .................. 10-2020-0150120

(51) Int. Cl.
G06T 3/00 (2006.01)
G06T 7/00 (2017.01)
(Continued)

(52) U.S. Cl.
CPC ............. *G06T 3/0012* (2013.01); *G06N 3/08* (2013.01); *G06T 7/0002* (2013.01); *G06T 7/50* (2017.01);
(Continued)

(58) Field of Classification Search
CPC ....... G06T 3/0012; G06T 7/0002; G06T 7/50; G06T 7/60; G06T 2207/20081;
(Continued)

(56) References Cited

U.S. PATENT DOCUMENTS 9,396,508 B2 7/2016 Otero et al.
9,609,307 B1 3/2017 Lopez et al.
(Continued)

FOREIGN PATENT DOCUMENTS

KR 96-35351 A 10/1996
KR 2000-0068773 A 11/2000
(Continued)

OTHER PUBLICATIONS

Kossaifi, J., et al., "GAGAN: Geometry-Aware Generative Adversarial Networks", Proceedings of the IEEE Conference on Computer Vision and Pattern Recognition (CVPR), 2018, pp. 878-887.*
(Continued)

*Primary Examiner* — Xuemei G Chen
(74) *Attorney, Agent, or Firm* — NSIP Law

(57) ABSTRACT

A method and apparatus for generating an image and for training an artificial neural network to generate an image are provided. The method of generating an image, including receiving input data comprising conditional information and image information, generating a synthesized image by applying the input data to an image generation neural network configured to maintain geometric information of the image information and to transform the remaining image information based on the conditional information, and outputting the synthesized image.

24 Claims, 13 Drawing Sheets

(51) Int. Cl.
*G06T 7/50* (2017.01)
*G06N 3/08* (2023.01)
*G06T 7/60* (2017.01)

(52) U.S. Cl.
CPC ...... *G06T 7/60* (2013.01); *G06T 2207/20081* (2013.01); *G06T 2207/20084* (2013.01)

(58) Field of Classification Search
CPC . G06T 2207/20084; G06T 11/00; G06T 5/50; G06T 3/00; G06T 7/13; G06N 3/08; G06N 3/045
See application file for complete search history.

(56) References Cited

U.S. PATENT DOCUMENTS

| | | | |
|---|---|---|---|
| 10,219,736 B2 | 3/2019 | Davis et al. | |
| 10,547,823 B2 | 1/2020 | Chauhuri et al. | |
| 11,205,096 B2* | 12/2021 | Zhang | G06N 3/047 |
| 11,257,276 B2* | 2/2022 | Chandran | G06T 17/00 |
| 11,263,487 B2* | 3/2022 | Li | G06F 18/217 |
| 11,347,973 B2* | 5/2022 | Rhee | G06V 10/82 |
| 2010/0315412 A1 | 12/2010 | Sinha et al. | |
| 2020/0320777 A1* | 10/2020 | Meshry | G06N 3/082 |
| 2021/0158139 A1* | 5/2021 | Mai | G06N 3/045 |
| 2021/0358177 A1* | 11/2021 | Park | G06N 3/08 |
| 2021/0374552 A1* | 12/2021 | Mallya | G06N 3/045 |
| 2022/0028139 A1* | 1/2022 | Mitra | G06N 3/088 |
| 2022/0051146 A1* | 2/2022 | Verma | G06N 3/088 |
| 2022/0051479 A1* | 2/2022 | Agarwal | G06N 3/045 |
| 2022/0301114 A1* | 9/2022 | Marras | G06T 5/50 |
| 2022/0343475 A1* | 10/2022 | Zhang | G06T 5/50 |

FOREIGN PATENT DOCUMENTS

| | | | |
|---|---|---|---|
| KR | 10-2004-0051510 A | 6/2004 | |
| KR | 10-2006-0107899 A | 10/2006 | |
| KR | 10-2010-0016731 A | 2/2010 | |
| KR | 10-2012-0031012 A | 3/2012 | |
| KR | 10-1507992 B1 | 4/2015 | |
| KR | 10-2016-0085708 A | 7/2016 | |
| KR | 10-1733346 B1 | 5/2017 | |

OTHER PUBLICATIONS

Isola, Phillip, et al., "Image-to-Image Translation with Conditional Adversarial Networks," *Proceedings of the IEEE conference on computer vision and pattern recognition*, 2017 (pp. 1-10).

Wang, Ting-Chun, et al. "High-Resolution Image Synthesis and Semantic Manipulation with Conditional GANs," *Proceedings of the IEEE conference on computer vision and pattern recognition*, 2018 (pp. 8798-8807).

Fu, Huan, et al., "Geometry-Consistent Generative Adversarial Networks for One-Sided Unsupervised Domain Mapping," *Proceedings of the IEEE/CVF Conference on Computer Vision and Pattern Recognition*, 2019 (pp. 2427-2436).

Liu, Xihui, et al., "Learning to Predict Layout-to-image Conditional Convolutions for Semantic Image Synthesis," *arXiv preprint arXiv:1910. 06809*, 2019 (pp. 1-15).

Park, Taesung, et al., "Semantic Image Synthesis with Spatially-Adaptive Normalization," *Proceedings of the IEEE/CVF Conference on Computer Vision and Pattern Recognition*, 2019 (pp. 2237-2346).

Dupont, Emilien, et al., "Equivariant Neural Rendering," *International Conference on Machine Learning. PMLR*, 2020 (pp. 1-10).

Lu, Xiaohu, et al., "Geometry-Aware Satellite-to-Ground Image Synthesis for Urban Areas." *Proceedings of the IEEE/CVF Conference on Computer Vision and Pattern Recognition*, 2020 (pp. 859-867).

Zhu, Peihao, et al., "SEAN: Image Synthesis with Semantic Region-Adaptive Normalization," *Proceedings of the IEEE/CVF Conference on Computer Vision and Pattern Recognition*, 2020 (pp. 5104-5113).

* cited by examiner

Training with real images
- - - - - - - - - - - - - - - - - - - - - - - - - - - -
Training with fake images

COMPUTING METHOD AND APPARATUS WITH IMAGE GENERATION

CROSS-REFERENCE TO RELATED APPLICATIONS

This application claims the benefit under 35 USC § 119(a) of Korean Patent Application No. 10-2020-0150120, filed on Nov. 11, 2020, in the Korean Intellectual Property Office, the entire disclosure of which is incorporated herein by reference for all purposes.

BACKGROUND

Field

The following description relates to computing method and apparatus with image generation.

2. DESCRIPTION OF RELATED ART

With the development of artificial neural networks (ANNs), various methods are being developed to generate an image representing an object, such as a human face or nature, that has relatively irregular and various structural variations and that is similar to a real object such that it is difficult to distinguish between the generated object and the real object.

However, for example, if an image representing an object with a partially restricted structure, such as an indoor space or a cityscape, is generated, it is difficult to fully consider a three-dimensional (3D) geometry during generation of a desired scene according to existing transformation methods. Accordingly, an image in which a straight line or perspective within a region does not properly match may be generated. A user may easily find that the generated image is fake. If an input image contains an artifact with a prominent straight line, vanishing points according to a perspective view may be easily defined and conspicuous, so that the user may easily identify that the generated image is a fake image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of generating an image, the method including receiving input data comprising conditional information and image information, generating a synthesized image by applying the input data to an image generation neural network configured to maintain geometric information of the image information and to transform the remaining image information based on the conditional information, and outputting the synthesized image.

The method may include receiving depth information corresponding to the conditional information, and extracting feature information from the depth information, wherein the generating of the synthesized image comprises generating the synthesized image by applying the input data and the feature information to the image generation neural network that maintains the geometric information included in the image information and that transforms the remaining image information based on the conditional information.

The image generation neural network may be trained by a first loss generated based on a comparison between a first synthesized image that corresponds to the conditional information and is transformed based on a transformation relationship of the conditional information and a second synthesized image that corresponds to the conditional information and is transformed based on depth information corresponding to the conditional information.

The conditional information may include structure information of any one or any combination of semantic information, edge information, and skeleton information.

The method may include receiving depth information corresponding to the conditional information, generating a first synthesized image corresponding to the conditional information by the image generation neural network based on the image information, transforming the conditional information based on the depth information, generating a second synthesized image corresponding to the transformed conditional information by the image generation neural network based on the image information, and training the image generation neural network by comparing the first synthesized image and the second synthesized image based on a transformation relationship of the conditional information.

In another general aspect, there is provided a method of training a neural network, the method comprising receiving training data comprising conditional information and image information, receiving depth information corresponding to the conditional information, generating a first synthesized image corresponding to the conditional information by an image generation neural network based on the image information, transforming the conditional information based on the depth information, generating a second synthesized image corresponding to the transformed conditional information by the image generation neural network based on the image information, and training the image generation neural network by comparing the first synthesized image and the second synthesized image based on a transformation relationship of the conditional information.

The training of the image generation neural network may include transforming the first synthesized image based on the transformation relationship of the conditional information, and generating a first loss based on a first difference between the transformed first synthesized image and the second synthesized image.

The generating of the first loss may include generating the first loss to maintain a geometry consistency between the transformed first synthesized image and the second synthesized image.

The image generation neural network may include inversely transforming the second synthesized image based on the transformation relationship of the conditional information, and generating a second loss based on a second difference between the inversely transformed second synthesized image and the first synthesized image.

The generating of the second loss may include generating the second loss to maintain a geometry consistency between the inversely transformed second synthesized image and the first synthesized image.

The transforming of the conditional information may include unprojecting the training data to a three-dimensional (3D) space by a transformation relationship based on the depth information, and transforming the conditional information by projecting the unprojected training data to a viewpoint.

The conditional information may include structure information of any one or any combination of semantic information, edge information, and skeleton information.

The method may include extracting a first geometric feature from the conditional information, and extracting a second geometric feature from the first synthesized image, wherein the training of the image generation neural network further comprises generating a third loss for training the image generation neural network, based on a difference between the first geometric feature and the second geometric feature.

The method may include extracting a third geometric feature from the transformed conditional information, and extracting a fourth geometric feature from the second synthesized image, wherein the training of the image generation neural network further comprises generating a fourth loss for training the image generation neural network, based on a difference between the third geometric feature and the fourth geometric feature.

The method may include transforming a second geometric feature extracted from the first synthesized image based on the depth information, wherein the training of the image generation neural network comprises generating a fifth loss for training the image generation neural network, based on a difference between the transformed second geometric feature and a fourth geometric feature extracted from the second synthesized image.

The method may include extracting depth feature information from the depth information, wherein the generating of the first synthesized image further comprises generating the first synthesized image corresponding to the depth feature information and the conditional information by the image generation neural network based on the image information.

The transforming of the conditional information may include transforming the conditional information and the depth feature information based on the depth information.

The generating of the second synthesized image may include generating the second synthesized image corresponding to the transformed conditional information and the transformed depth feature information by the image generation neural network based on the image information.

The method may include any one or any combination of training an image discrimination neural network to estimate the first synthesized image as a fake image, training the image discrimination neural network to estimate the second synthesized image as the fake image, and training the image discrimination neural network to estimate the image information as a real image.

The method may include generating a synthesized image by applying the input data to the trained image generation neural network, and outputting the synthesized image.

In another general aspect, there is provided an apparatus for generating an image, the apparatus including a communication interface configured to receive input data including conditional information and image information, a processor configured to generate a synthesized image by applying the input data to an image generation neural network configured to maintain geometric information of the image information and to transform the remaining image information based on the conditional information, and an output device configured to output the synthesized image.

In another general aspect, there is provided a method of training a neural network, the method including receiving training data comprising image information, conditional information, and depth information corresponding to the conditional information, extracting depth feature information from the depth information, generating a first synthesized image corresponding to the depth feature information and the conditional information by the image generation neural network based on the image information, transforming the conditional information and the depth feature information based on the depth information, generating a second synthesized image corresponding to the transformed conditional information and the transformed depth feature information by the image generation neural network based on the image information, and training the image generation neural network by comparing the first synthesized image and the second synthesized image based on a transformation relationship of the conditional information and the depth information.

The training of the image generation neural network may include transforming the first synthesized image based on the transformation relationship, and training the image generation neural network to minimize a difference between the transformed first synthesized image and the second synthesized image.

The depth feature information may be based on extracting a discontinuity portion of the depth information and a discontinuity portion of the normal information.

Other features and aspects will be apparent from the following detailed description, the drawings, and the claims.

Figure 1:
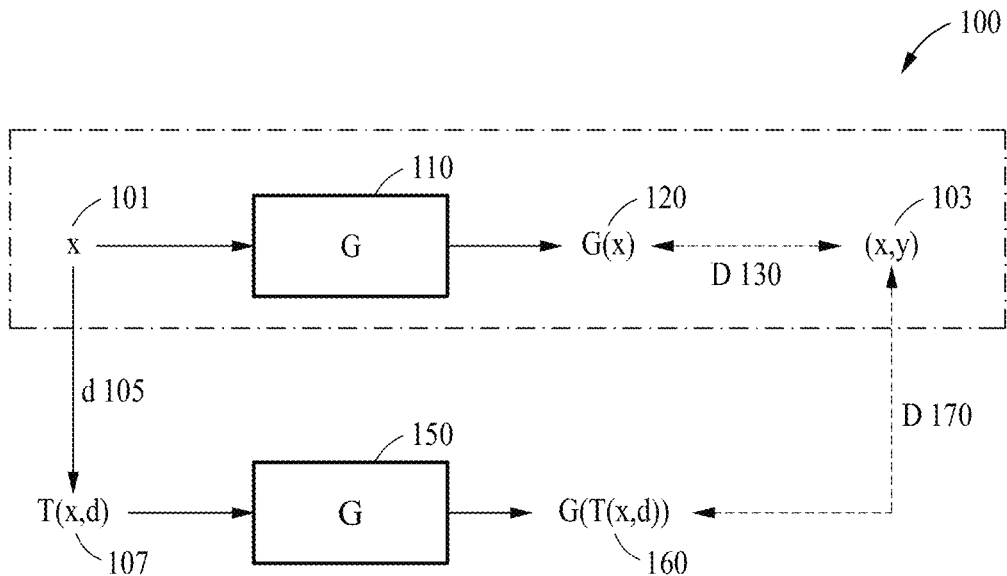
FIG. 1 illustrates an example of a generating an image.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. As used herein, the term "and/or" includes any one and any combination of any two or more of the associated listed items. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings, and like reference numerals in the drawings refer to like elements throughout.

FIG. 1 illustrates an example of a generating an image. FIG. 1 illustrates image generation neural networks 110 and 150, denoted by generators (G), 110 and 150, and image discrimination neural networks 130 and 170, denoted by discriminators (D).

A dashed line box of FIG. 1 indicates a structure of a generative adversarial network (GAN) 100. A training-based image-to-image transformation may be performed to train the image generation neural network G 110 that transforms an input image x 101. The image generation neural network 110 generates a fake image that is very similar to training data (for example, the input image x 101) to deceive the image discrimination neural network D 130. The image generation neural network 110, together with the image discrimination neural network 130, may be trained using an adversarial loss for deceiving the image discrimination neural network 130 that a first synthesized image G(x) 120 generated by the image generating neural network 110 is true. Thus, the image generation neural network 110 may generate a more realistic image.

The image discrimination neural network 130 may aim to discriminate a real image of the training data from a fake image, for example, the first synthesized image G(x) 120, which is generated by the image generation neural network 110. The GAN may increase a discrimination ability of the image discrimination neural network 130 and may train the image generation neural network 110 together with the image discrimination neural network 130 so that the image generation neural network 110 may effectively deceive the image discrimination neural network 130. Through the above training, the image generation neural network 110 may generate a fake image with a striking similarity to the real image so that its difficult distinguish between a real image and a fake image, and the discrimination ability of the image discrimination neural network 130 may also be improved. A method of training the image generation neural network 110 and the image discrimination neural network 130 of the GAN will be further described below with reference to FIGS. 2A and 2B.

In an example, when a conditional GAN is used, the image discrimination neural networks 130 and 170 may be trained to determine (x, y) 103 as true and determine (x, G(x)) as false. For example, based on a structure of the conditional GAN of FIG. 1, a network may be configured with various structures of a neural network, a definition of an adversarial loss, and additionally used losses.

By defining the concept of three-dimensional (3D) geometry consistency, an image may be transformed so that geometry in the image may be preserved. The term "geometry consistency" used herein may be construed to mean that geometric information before and after transformation of an image remain unchanged. The geometric information may include, for example, structure information such as semantic information, edge information, and skeleton information, but is not necessarily limited thereto. The edge information may correspond to two-dimensional (2D) appearance information of an object included in an input image, and the skeleton information may correspond to 3D pose information of an object included in an input image.

In an example, a loss, for example, a geometry consistency loss, that uses depth information in addition to the concept of the geometry consistency may be used to transform an image so that geometry in the image is preserved. To this end, data including depth information in addition to an input image and a result image during the training of a neural network may be used. However, if it is not possible to use the depth information during transformation of a real image, the depth information may be used during training only, and the real image may be transformed without the depth information.

For example, as shown in FIG. 1, when depth information d 105 is provided for the input image x 101, the input image x 101 may be expressed in a 3D space in consideration of a view frustum. The input image x 101 unprojected to the 3D space may be projected back to an arbitrary viewpoint and may be transformed into an image T(x,d) 107 of a new view. A training apparatus may transform the input image x 101 into the image T(x,d) 107 of the new view based on transformation information T in consideration of 3D. The above-described transformation may be referred to as "3D transformation" and may be expressed by T(x,d).

The training apparatus may generate a second synthesized image G (T(x,d)) 160 through image transformation, by applying the image T(x,d) 107 of the new view to the image generation neural network 150. A transformation relationship between the first synthesized image G(x) 120 obtained by image transformation using the image generation neural network 110 and the second synthesized image G (T(x,d)) 160 obtained by image transformation using the image generation neural network 150 may be established. Such a transformation relationship between transformed images may be used as a constraint to preserve the geometry during image transformation by an image generation neural network. In an example, the transformation relationship between the first synthesized image G(x) 120 and the second synthesized image G (T(x,d)) 160 is predetermined.

Computing devices that are referred to as performing the training operation, may also perform inference, or may perform inference or training alone. Likewise, reference to computing devices that perform the inference operation may also perform training, or inference or training alone.

In an example, the image generation neural network 110 may be trained based on an adversarial loss basically used in the GAN together with a geometry consistency loss that minimizes a difference between transformed images. Thus, the image generation neural network 110 may generate a result image that maintains a corresponding geometric structure even though a view varies depending on geometric conditions that may be inferred from the input image x 101.

By applying the above-described concept of the geometry consistency to training, a single input image with a large number of straight lines and clear perspective may be consistently changed even during view transformation.

Figure 2A:
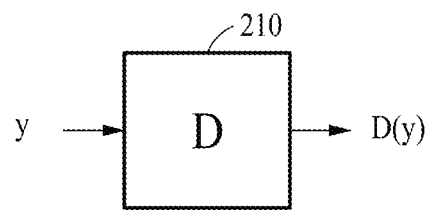
FIGS. 2A and 2B illustrate examples of a method of training a generative adversarial network (GAN).
Figure 2B:
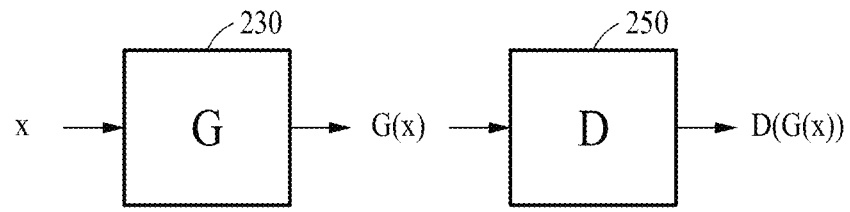

FIGS. 2A and 2B illustrate examples of a method of training a GAN. FIG. 2A illustrates a process of training an image discrimination neural network D 210 based on a real image, and FIG. 2B illustrates a process of training an image generation neural network G 230 and an image discrimination neural network D 250 based on a synthesized image G(x) obtained by image transformation.

In FIG. 2A, the image discrimination neural network 210 may discriminate between a real image and a fake image. For example, the image discrimination neural network D 210 may be trained to output "1" for the real image and to output "0" for the fake image.

In an example, a training apparatus may train the image discrimination neural network 210 to estimate a target image y included in training data or image information of the target image y as a real image.

In FIG. 2B, the image discrimination neural network D 250 may discriminate between a real image and a synthesized image. For example, the image discrimination neural network 250 may be trained to output "1" for the real image and to output "0" for the synthesized image.

The image generation neural network 230 may generate the synthesized image G(x) by receiving an input image x. The image generation neural network G 230 may be trained to deceive the image discrimination neural network D 250 with the generated synthesized image G(x) and to output "1".

The training apparatus may train the image discrimination neural network 250 to estimate a first synthesized image as a fake image by an adversarial loss. Also, the training apparatus may train the image discrimination neural network 250 to estimate a second synthesized image as a fake image.

Examples of operations of the image generation neural network G 230 and the image discrimination neural network D 250 will be described in more detail with reference to Equation 1 shown below.

$$\mathcal{L}_{GAN}(G, D, X, Y) = \mathbb{E}_{y \sim p_{data}(y)}[\log D(y)] + \mathbb{E}_{x \sim p_{data}(x)}[\log(1 - D(G(x)))]$$ [Equation 1]

An operation will be described below from the perspective of the image discrimination neural network D 250.

In Equation 1, $y \sim p_{data}(y)$ corresponds to a probability density function and indicates sampling of distribution of real data. For example, $y \sim p_{data}(y)$ may indicate that a value of y is extracted one by one from "1000" target images (for example, pedestrian images) if the "1000" target images are included in training data.

The image discrimination neural network D 250 may need to output a value close to "1" for the real image, and thus the image discrimination neural network D 250 may be expressed mathematically to maximize a value of [log D(y)]. The image discrimination neural network D 250 may output a value between "0" and "1".

In $x \sim p_{data}(x)$, x may be a random value. Also, x may be input to the image generation neural network G 230. For example, the image generation neural network G 230 may perform sampling of a multi-dimensional vector based on a Gaussian distribution (normal distribution). If a random multi-dimensional vector x is received, the image generation neural network G 230 may generate a synthesized image of a second domain from a synthesized image of a first domain. The image generation neural network G 230 may generate an image with a transformed domain, and thus the image generation neural network G 230 may be referred to as a "generator" or a "transformer". If G(x) is received, the image discrimination neural network D 250 may need to output a value close to "0", which may be mathematically expressed as [log(1−D(G(x)))].

An operation will be described below from the perspective of the image generation neural network G 230.

Since a value of $\mathbb{E}_{y \sim p_{data}(y)}[\log D(y)]$ in Equation 1 needs to be minimized and the image generation neural network G 230 is not used to train the image discrimination neural network D 250, $y \sim p_{data}(y)$ in Equation 1 may correspond to a portion in which the image generation neural network G 230 is not involved.

Thus, the image generation neural network G 230 may be trained so that $\mathbb{E}_{x \sim p_{data}(x)}[\log(1-D(G(x)))]$ in Equation 1 may be minimized. Unlike the image discrimination neural network D 250, the image generation neural network G 230 may be trained to allow D(G(x)) to be "1".

The image discrimination neural network D 250 may be trained to output "1" for an input image of the second domain and to output "0" for a synthesized image of which a domain is transformed from the first domain to the second domain. For training of the image discrimination neural network D 250, various physical quantities, for example, a cross-entropy or a least square error value, may be used.

Hereinafter, an image generation neural network and/or an image discrimination neural network may be construed as performing training using an adversarial loss together with a geometric consistency loss that will be described below.

Figure 3:
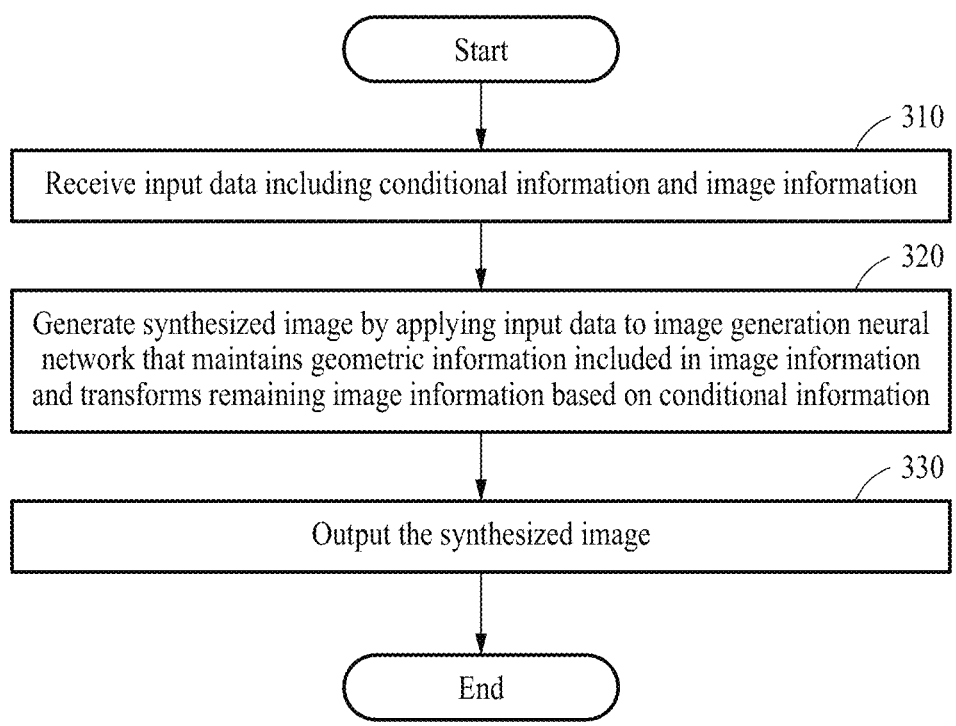
FIG. 3 illustrates an example of a method of generating an image.

FIG. 3 illustrates an example of a method of generating an image. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In an example, a computing apparatus (hereinafter referred to as a "generation apparatus") that generates an image may generate a synthesized image that maintains geometric information included in image information through operations 310 through 330. In addition to the description of FIG. 3 below, the descriptions of FIGS. 1-2 are also applicable to FIG. 3, and are incorporated herein by reference. Thus, the above description may not be repeated here.

In operation 310, the generation apparatus may receive input data that includes conditional information and image information. The conditional information may correspond to structure information included in an input image and may include, for example, semantic information, edge information or skeleton information.

In operation 320, the generation apparatus may generate a synthesized image by applying the input data received in operation 310 to an image generation neural network that maintains geometric information included in the image information and that transforms the remaining image information based on the conditional information. In an example, the image generation neural network may be trained by a loss generated based on a comparison result between a first synthesized image that corresponds to the conditional information and that is transformed based on a transformation relationship of the conditional information and a second synthesized image that corresponds to the conditional information and that is transformed based on depth information corresponding to the conditional information. Examples of training of the image generation neural network will be further described below with reference to FIGS. 4 to 12.

Depending on examples, in operation 310, the generation apparatus may also receive depth information corresponding to the conditional information. In this example, in operation 320, the generation apparatus may extract feature information from the depth information and may generate a synthesized image by applying the feature information and the input data to the image generation neural network.

In operation 330, the generation apparatus may output the synthesized image. For example, the generation apparatus may output the synthesized image using a display included in the generation apparatus, or may output the synthesized image to an external device, however, examples are not limited thereto.

Figure 4:
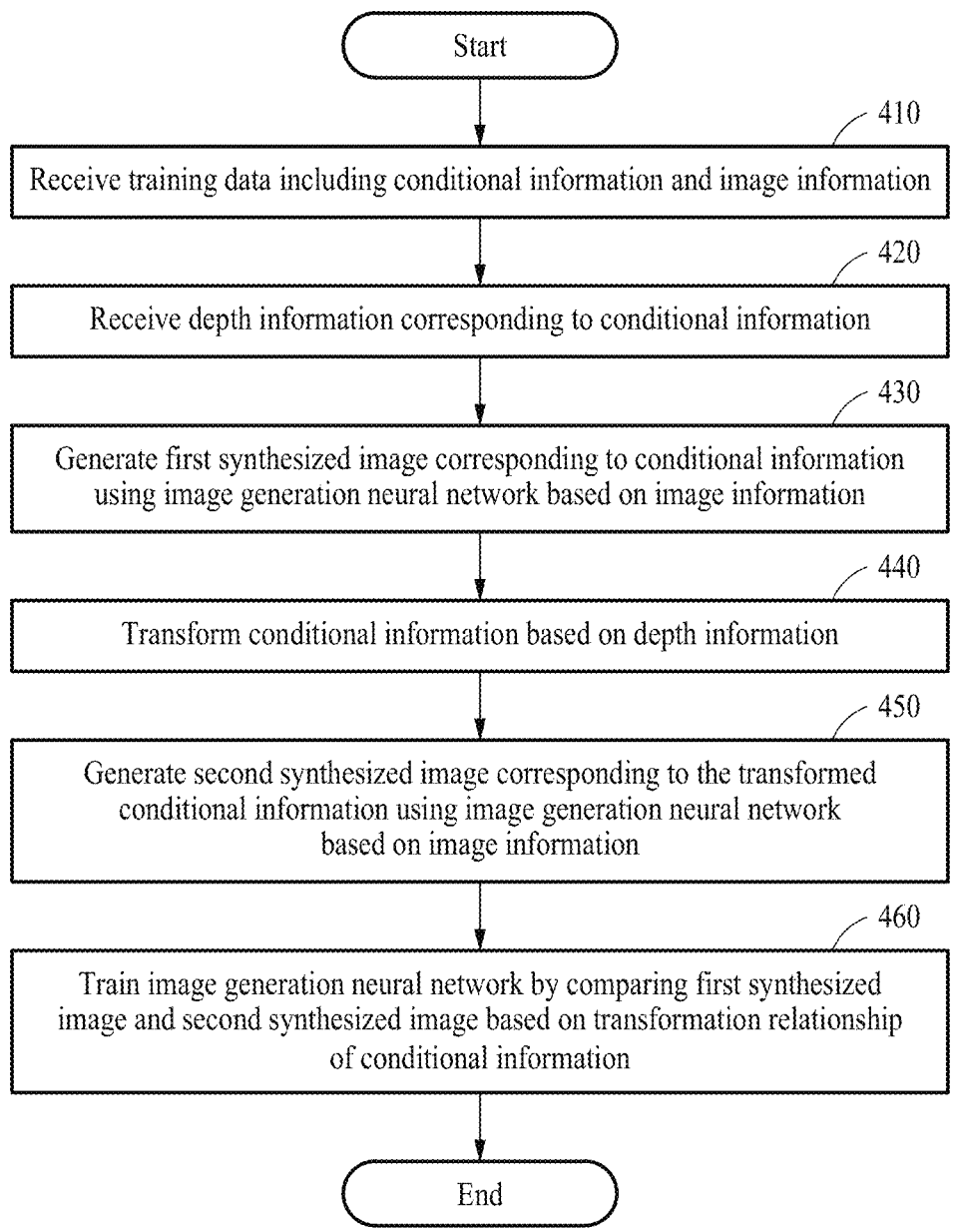
FIG. 4 illustrates an example of a method of training a neural network to generate an image.

FIG. 4 illustrates an example of a method of training a neural network to generate an image. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In an example, a computing apparatus is a training apparatus that trains an image generation neural network through a process of operations 410 through 460. In addition to the description of FIG. 4 below, the descriptions of FIGS. 1-3 are also applicable to FIG. 4, and are incorporated herein by reference. Thus, the above description may not be repeated here.

In operation 410, the training apparatus may include training data that includes conditional information x and image information y. The conditional information may include, for example, structure information of at least one of semantic information, edge information, and skeleton information.

In operation 420, the training apparatus may receive depth information d corresponding to the conditional information. The depth information may include one or more information, such as, for example, a depth image, a depth map, and a depth value.

In operation 430, the training apparatus may generate a first synthesized image G(x) corresponding to the conditional information using an image generation neural network based on the image information.

In operation 440, the training apparatus may transform the conditional information based on the depth information. The transformed conditional information may correspond to, for example, the above-described T(x,d). An example in which the training apparatus transforms the conditional information will be further described below with reference to FIG. 5.

In operation 450, the training apparatus may generate a second synthesized image G(T(x,d)) corresponding to the transformed conditional information using the image generation neural network based on the image information.

In operation 460, the training apparatus may train the image generation neural network by comparing the first synthesized image and the second synthesized image based on a transformation relationship of the conditional information.

In an example, in operation 460, the training apparatus may transform the first synthesized image based on the transformation relationship of the conditional information. The training apparatus may generate a first loss for training the image generation neural network, based on a difference of a comparison between the transformed first synthesized image and the second synthesized image. A process in which the training apparatus trains the image generation neural network by the first loss will be further described below with reference to FIG. 6. Also, a training apparatus for training a neural network through the process of FIG. 6 and a structure of a generation apparatus for generating an image using an image generation neural network trained through the process of FIG. 6 will be further described below with reference to FIG. 7.

In an example, an operation of training the image generation neural network may be construed to include generating a loss for training a neural network.

In another example, in operation 460, the training apparatus may inversely transform the second synthesized image based on the transformation relationship of the conditional information. The training apparatus may generate a second loss for training the image generation neural network, based on a difference, i.e., a second difference according to a comparison result between the inversely transformed second synthesized image and the first synthesized image. A process in which the training apparatus trains the image generation neural network by the second loss will be further described below with reference to FIG. 8. Also, a training apparatus for training a neural network through the process of FIG. 8 and a structure of a generation apparatus for generating an image using the image generation neural network trained through the process of FIG. 8 will be further described below with reference to FIG. 9.

In another example, in operation 460, the training apparatus may extract geometric features from each of the conditional information, the first synthesized image, the transformed conditional information, and the second synthesized image, and may generate losses for training the image generation neural network, based on a difference between the extracted geometric features. A process in which the training apparatus trains the image generation neural network by the losses based on the difference between the geometric features will be further described below with reference to FIGS. 10 and 11.

Depending on examples, the training apparatus may train the image generation neural network using an additional input channel that is based on the depth information, to generate a synthesized image. An example in which the training apparatus generates a synthesized image using an additional input channel will be further described below with reference to FIGS. 12 and 13.

Figure 5:
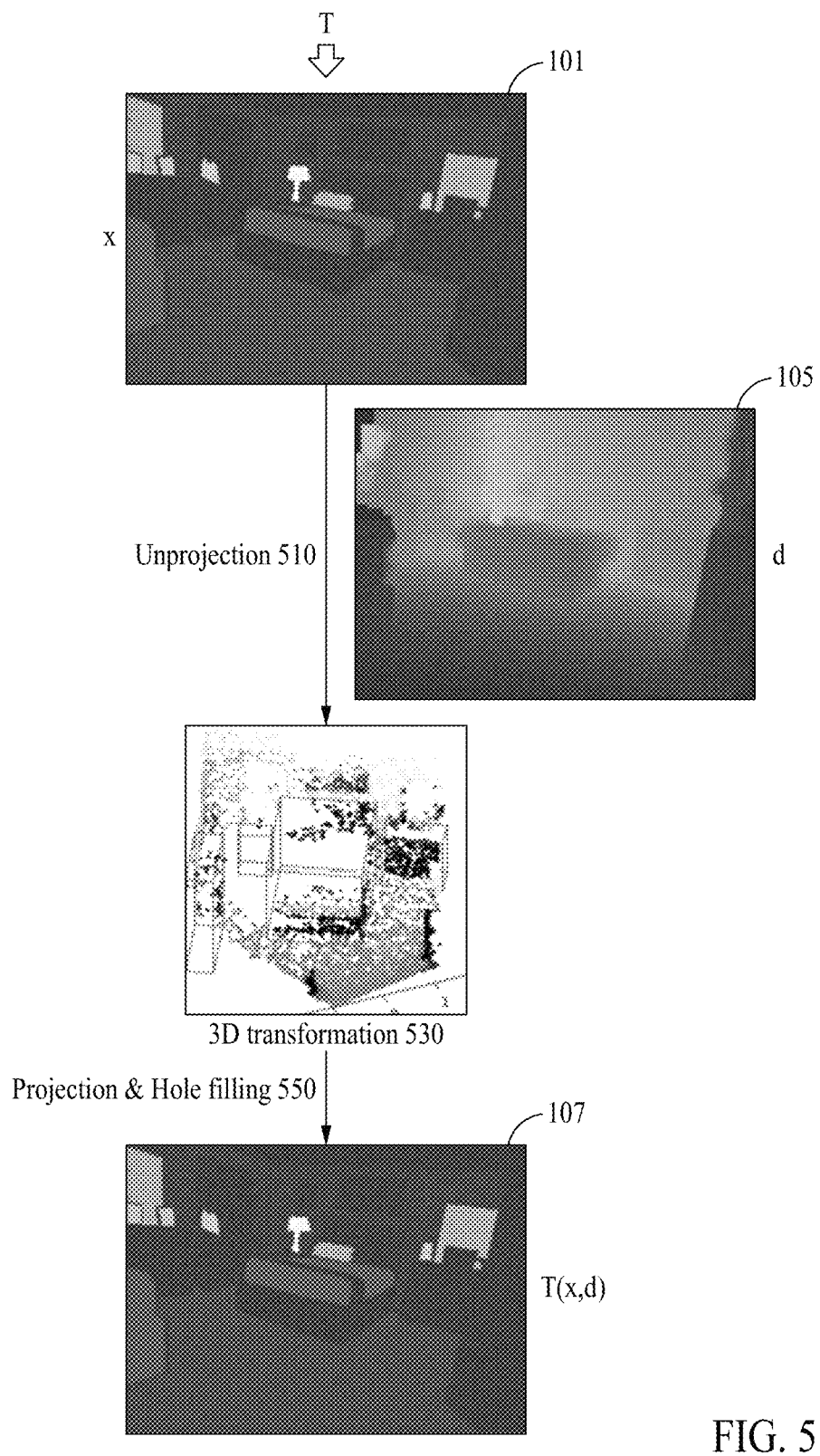
FIG. 5 illustrates an example of transforming conditional information based on depth information.

FIG. 5 illustrates an example of transforming conditional information based on depth information. FIG. 5 illustrates a process in which input conditional information x 101 is transformed to conditional information T(x, d) 107 with a transformed view by a transformation relationship T that is based on depth information d 105.

A training apparatus may perform unprojection 510 of training data including the conditional information x 101 to a 3D space by the transformation relationship T that is based on the depth information d 105 and may perform 3D transformation 530 of the conditional information x 101.

The training apparatus may perform projection 550 of the unprojected training data, that is, the conditional information x 101 of which the 3D transformation 530 is performed to an arbitrary viewpoint. The training apparatus may generate the conditional information T(x, d) 107 through the projection 550. However, it may be difficult to apply the above-described 3D transformation relationship T to all portions of an image. In an example, if an original image of an arbitrary view is transformed into an image of another view based on a transformation relationship, such as rotation or movement, a portion of the original image that is occluded by another portion and that is not viewed may appear. Since such a portion that is occluded by another portion and that is not viewed remains as a hole in a new view, a hole portion may need to be naturally filled.

However, most of the conditional information x 101, for example, semantic segmentation, an edge, or a skeleton, used as an input in a large number of image-to-image transformation may correspond to a form in which structural information of an input image is abstracted. Thus, in an example, depth-based hole filling to fill a corresponding hole portion based on the conditional information x 101 and the depth information d 105 may also be additionally performed. For example, when the input conditional information x 101 is semantic information such as semantic segmentation, the training apparatus may verify semantic information of a hole boundary portion and may fill a hole portion with pixels by semantic information with a greatest depth among the semantic information, to transform an image.

In another example, since it is relatively difficult to fill a hole in a natural image, an image may be transformed by removing a hole portion with a mask during calculation of the above-described geometry consistency loss.

Figure 6:
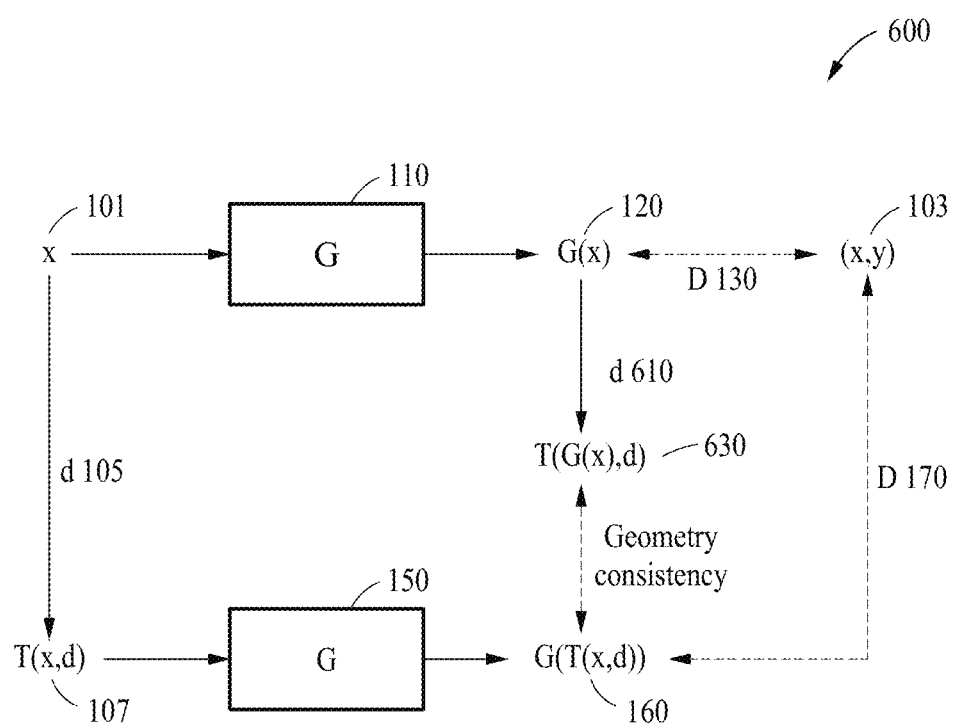
FIGS. 6, 8, and 10 to 12 illustrate examples of a method of training a neural network to generate an image.

FIG. 6 illustrates an example of a method of training a neural network to generate an image. FIG. 6 illustrates images 160 and 630 with geometry consistency.

In an example, an input image includes conditional information x 101, and depth information d 105 corresponding to the conditional information is provided. In this example, the input image including the conditional information x 101 may be transformed to a first synthesized image G(x) 120 through an image generation neural network 110. Also, the input image including the conditional information x 101 may be transformed to an image T(x,d) 107 of a new view as described above with reference to FIG. 1.

A second synthesized image G(T(x,d)) 160 may be generated when the image T(x,d) 107 is transformed by passing through an image generation neural network 150. A first synthesized image T(G(x),d) 630 is obtained by transforming the first synthesized image G(x) 120 generated through the image generation neural network 110 based on a transformation relationship of the conditional information by depth information d 610. The second synthesized image G(T(x,d)) 160 may be identical to the first synthesized image T(G(x),d) 630.

The element that the second synthesized image G(T(x,d)) 160 and the first synthesized image T(G(x),d) 630 may be identical to each other is referred to as "geometry consistency" or "geometry preserving constraints." A loss, hereinafter, referred to as a "first loss", for training an image generation neural network may be generated based on a difference between the second synthesized image G(T(x,d)) 160 and the first synthesized image T(G(x),d) 630.

In an example, the training apparatus 600 may generate the first loss to minimize a first difference Diff(T(G(x),d), G(T(x,d)) according to a comparison result between the second synthesized image G(T(x,d)) 160 and the first synthesized image T(G(x),d) 630 so that the geometry consistency is maintained. The first loss may correspond to a geometry consistency loss. In an example, the training apparatus 600 may use the first loss in addition to the above-described adversarial loss to train the image generation neural network 110.

The image generation neural network 110 trained using the first loss may be used as an image generation neural network in an actual inference process. The image generation neural network 110 may generate a result image that maintains a corresponding geometric structure even though a view varies depending on geometric conditions that may be inferred from conditional information x in an inference process. The image generation neural networks 110 and 150 may have the same structure. Also, image discrimination neural networks 130 and 170 may have the same structure. In addition, the depth information 105 and 610 may also be the same.

In an example, the training apparatus 600 may train neural networks so that a sum of the above-described adversarial loss and geometry consistency loss is minimized.

In an example, geometry consistency may be maintained in an image obtained through 3D transformation based on depth information during training for image transformation. Thus, even when a single input image is transformed, it is possible to maintain a 3D geometric structure in the transformed image.

Figure 7:
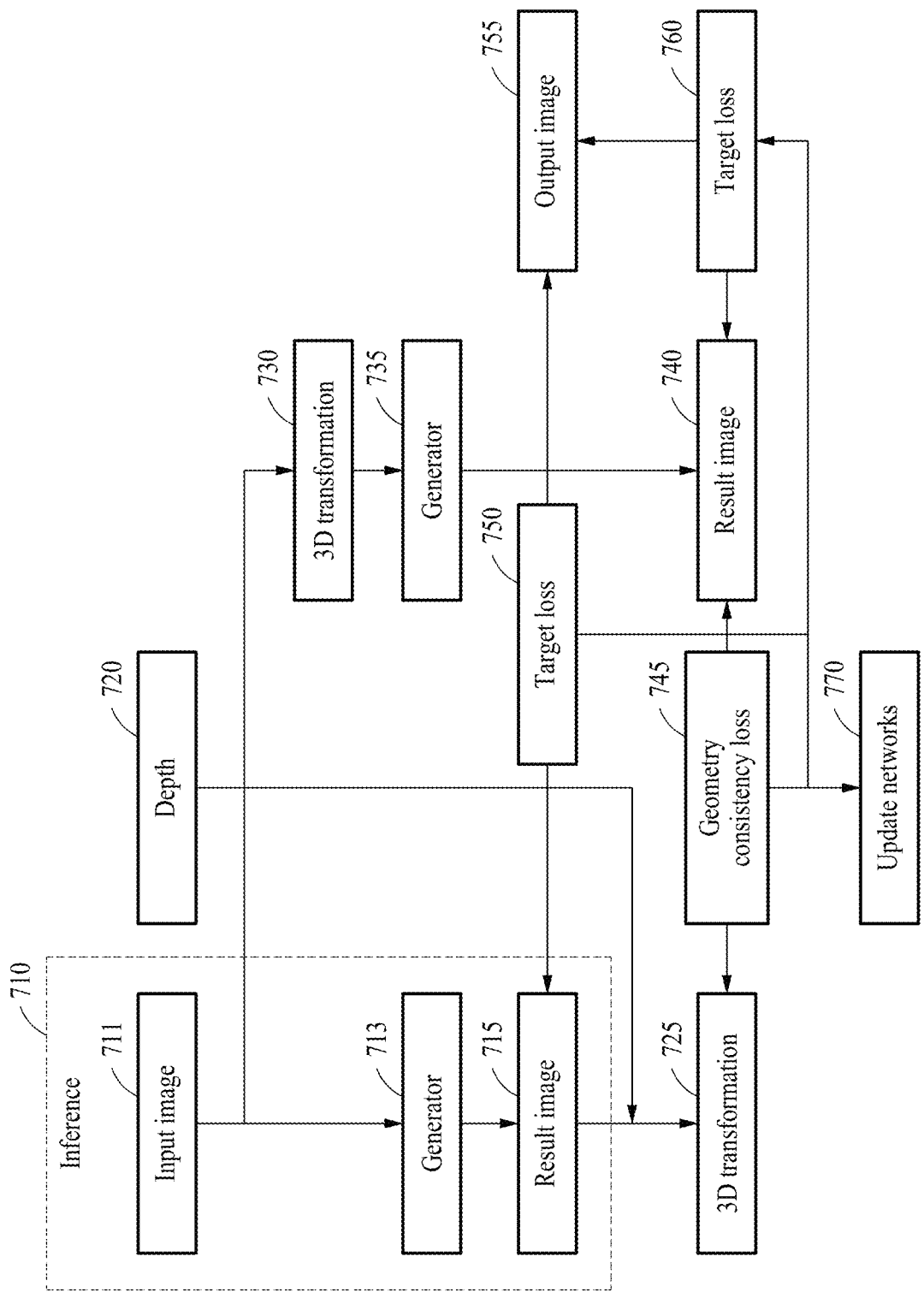
FIGS. 7, 9, and 13 illustrate examples of a configuration of an apparatus for generating an image and a configuration of a training apparatus for training a neural network.

FIG. 7 illustrates an example of a configuration of a generation apparatus and a configuration of a training apparatus for training a neural network as respective computing apparatus, or collectively as a single computing apparatus. The training apparatus of FIG. 7 may receive {Input x, Target y, Depth d} as input data. The training apparatus may train an image generation neural network Generator 713 that transforms an input image into an image of a target domain, based on the input data. In the following description, x may correspond to conditional information included in an input image. For convenience of description, in the following description, x may denote the input image, but may be construed to indicate the conditional information included in the input image. Also, y may correspond to a target image corresponding to a real object, or image information included in the target image. Since the target image corresponds to an output image that is to be output actually, the target image may be referred to as an "output image". d may correspond to depth information corresponding to the conditional information in the input image.

When an input image x 711 is received, the training apparatus may generate a result image 715, hereinafter, referred to as a "first synthesized image" 715, by transforming image information of the input image 711 using the image generation neural network 713.

The training apparatus may perform 3D transformation 730 of the input image 711 based on depth information 720. The training apparatus may generate a result image 740, hereinafter, referred to as a "second synthesized image" 740, corresponding to an image obtained through 3D transformation by a second image generation neural network 735.

The training apparatus may perform 3D transformation 725 of the first synthesized image 715 based on a transformation relationship of conditional information. The training apparatus may generate a geometry consistency loss 745 based on a first difference between the first synthesized image of which the 3D transformation 725 is performed and the second synthesized image 740.

Also, the training apparatus may calculate a target loss 750 that is based on a difference between the first synthesized image 715 and an output image y 755, and/or a target loss 760 between the second synthesized image 740 and the output image y 755. The term "target loss" used herein may be construed to include all the above-described adversarial loss, a feature matching loss and a perceptual loss.

The training apparatus may update 770 the image generation neural network 713 based on one or more of the losses. For example, the training apparatus may train the image generation neural network 713 by updating the image generation neural network 713 by a weighted sum that allows a sum of the geometry consistency loss 745, the target loss 750 and/or the target loss 760 to be minimized.

The image generation neural network 713 trained through the above-described process may be used in a generation apparatus 710 that performs an inference process of a real image transformation. When the image generation neural network 713 is used in the generation apparatus 710 that performs the real image transformation, the image generation neural network 713 may generate the first synthesized image 715 by maintaining geometric information included in the image information of the input image 711 and transforming the remaining image information based on the conditional information.

Figure 8:
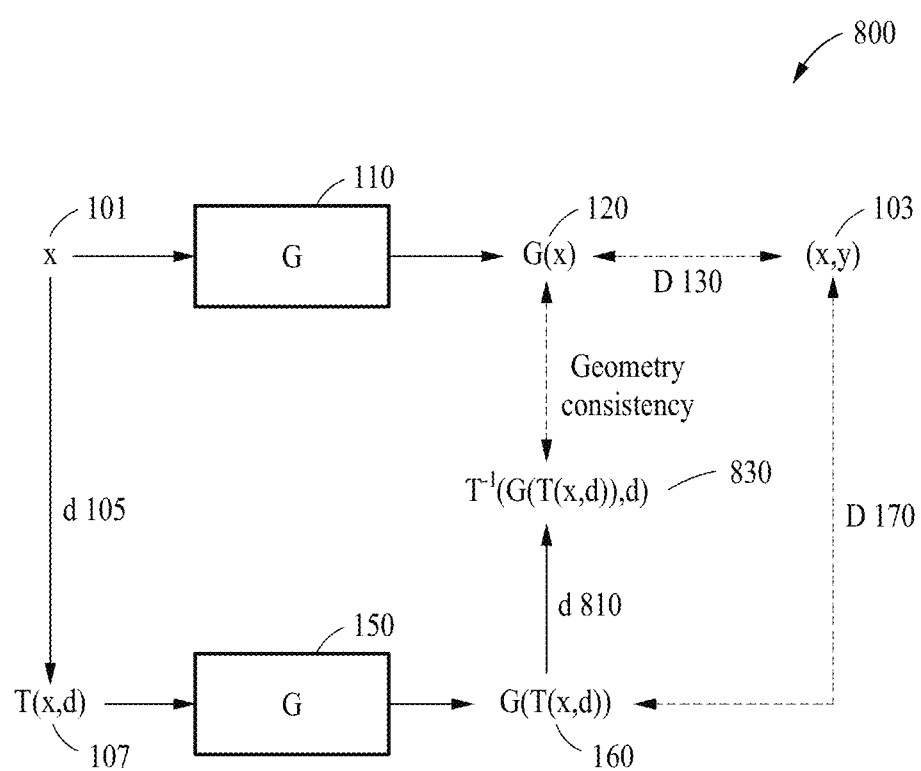

FIG. 8 illustrates another example of a method of training a neural network to generate an image. FIG. 8 illustrates a first synthesized image G(x) 120 with geometry consistency, and a second synthesized image $T^{-1}(G(T(x,d)),d)$ 830 obtained by inversely transforming a second synthesized image G (T(x,d)) 160 back to the original view.

In an example, a training apparatus 800 may generate the second synthesized image $T^{-1}(G(T(x,d)),d)$ 830 by inversely transforming the second synthesized image G (T(x,d)) 160 to the original view based on a transformation relationship of conditional information that is based on depth information d 810. The depth information d 810 may be the same as depth information 105.

The training apparatus 800 may generate a second loss for training an image generation neural network 110, based on a second difference $Diff(G(x), T^{-1}(G(T(x,d)),d))$ between the second synthesized image $T^{-1}(G(T(x,d)),d)$ 830 and the first synthesized image G(x) 120. The second loss may correspond to a geometry consistency loss.

The training apparatus 800 may minimize the second difference $(Diff(G(x), T^{-1}(G(T(x,d)),d)))$, to generate the second loss so that geometry consistency between the second synthesized image $T^{-1}(G(T(x,d)),d)$ 830 and the first synthesized image G(x) 120 is maintained.

In an example, the image generation neural network 110 may be trained using a first loss and/or a second loss in addition to the above-described adversarial loss. Thus, it is possible to generate a stable result image in terms of maintenance of a geometric structure. Also, using the first loss and/or the second loss during training of the image generation neural network 110 may be effective, particularly in image transformation for an environment in which it is relatively easy to estimate a geometric structure due to a large number of straight lines, for example, an indoor space or a city.

Figure 9:
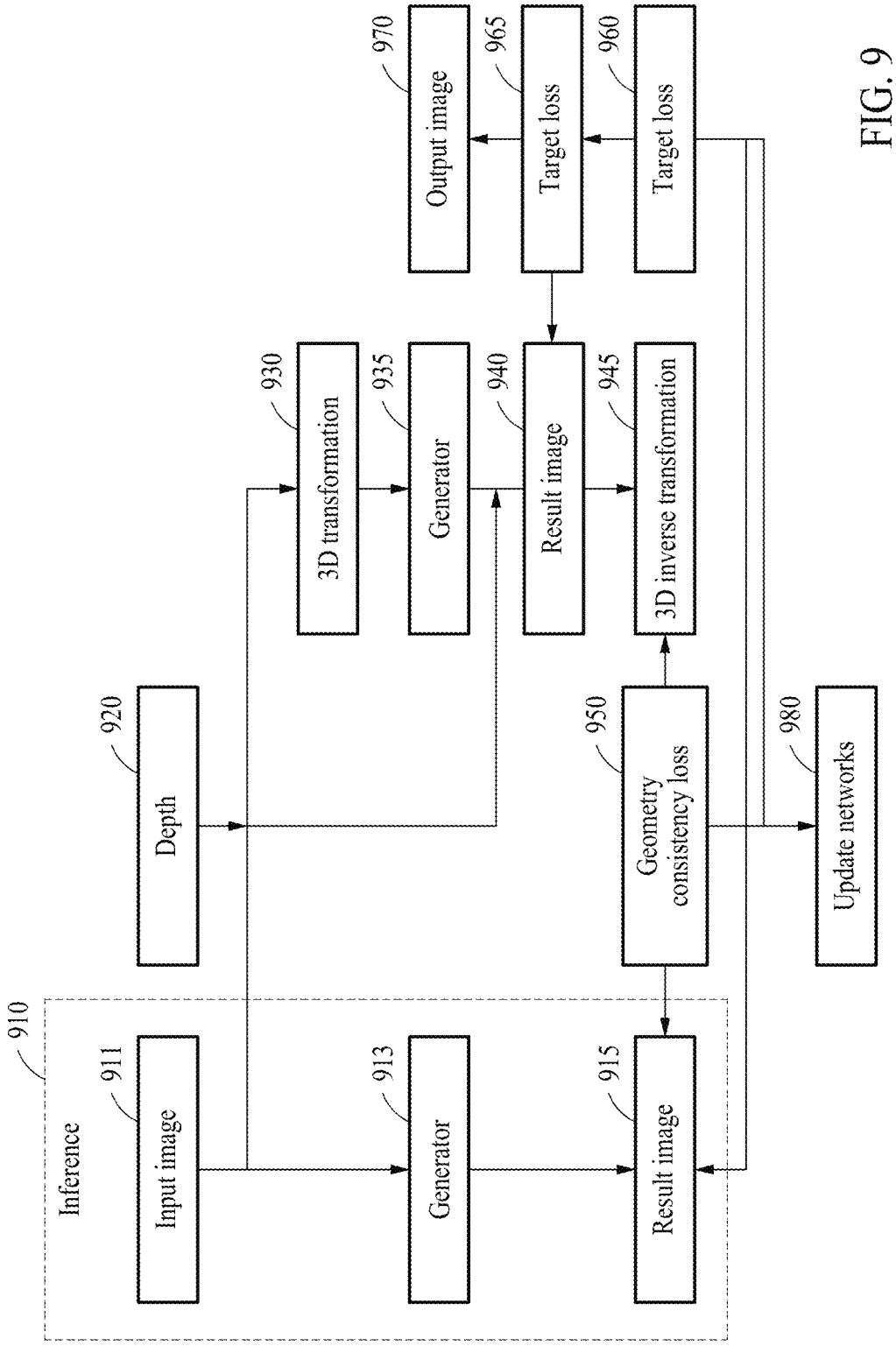

FIG. 9 illustrates another example of a configuration of a generation apparatus and a configuration of a training apparatus for training a neural network. The training apparatus of FIG. 9 may receive {Input x, Target y, Depth d} as input data in the same manner as the training apparatus of FIG. 7. The training apparatus may train an image generation neural network Generator 913 that transforms an input image 911 into an image of a target domain based on input data.

When the input image 911 is received, the training apparatus may generate a result image 915, hereinafter, referred to as a "first synthesized image" 915, by transforming image information using the image generation neural network 913.

The training apparatus may perform 3D transformation 930 of the input image 911 based on depth information 920. The training apparatus may generate a result image 940, hereinafter, referred to as a "second synthesized image" 940, corresponding to an image obtained through 3D transformation by a second image generation neural network 935.

The training apparatus may perform 3D inverse transformation 945 of the second synthesized image 940 based on a transformation relationship of the conditional information. The training apparatus may generate a geometry consistency loss 950 based on a difference between the second synthesized image of which the 3D inverse transformation 945 is performed and the first synthesized image 915.

Also, the training apparatus may calculate a target loss 960 that is based on a difference between the first synthesized image 915 and an output image 970, and/or a target loss 965 that is based on a difference between the second synthesized image 940 and the output image 970.

For example, the training apparatus may train the image generation neural network 913 by updating the image generation neural network 913 by a weighted sum that allows a sum of the geometry consistency loss 950, the target loss 960 and/or the target loss 965 to be minimized.

The image generation neural network 913 trained through the above-described process may be used in a generation apparatus 910 that transforms a real image.

Figure 10:
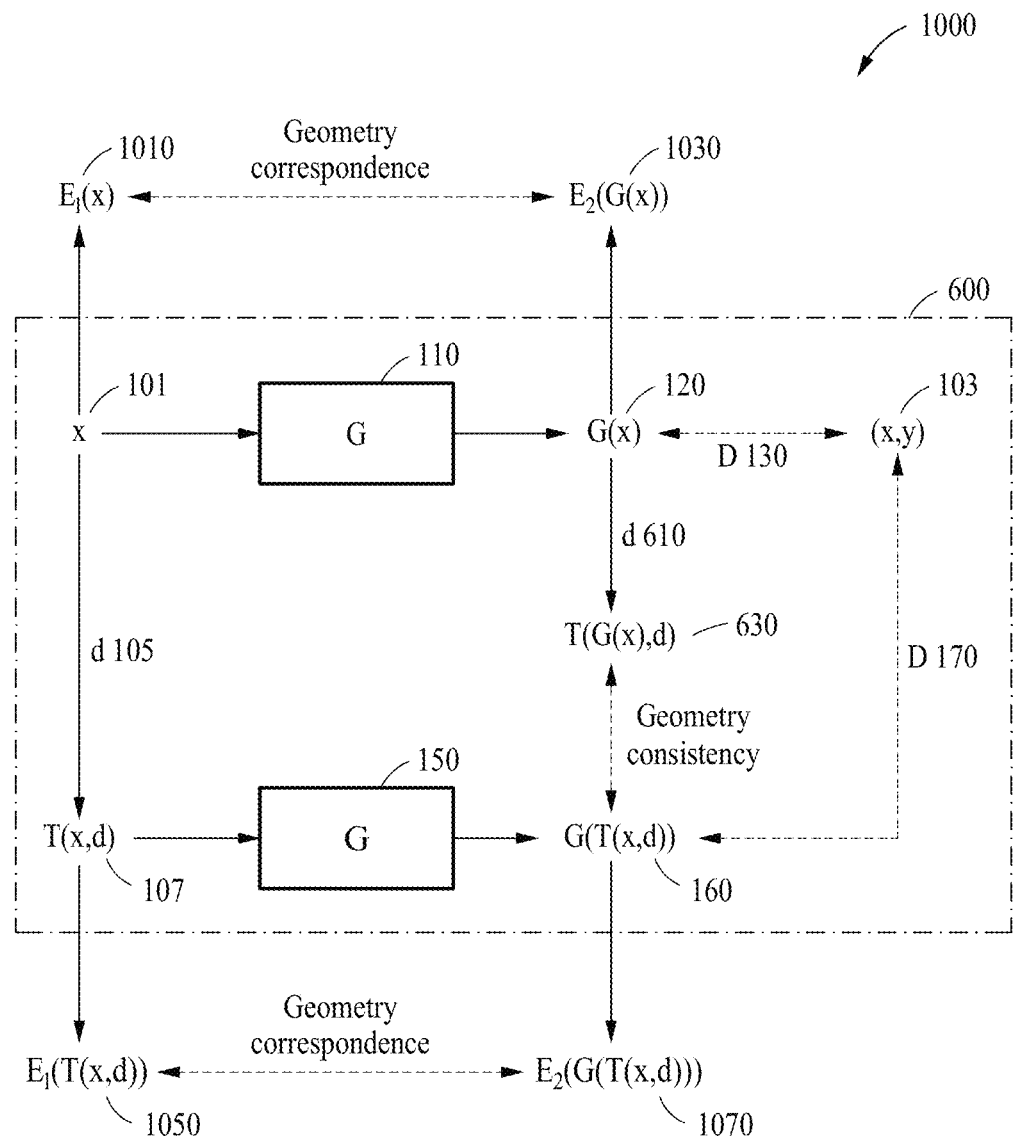

FIG. 10 illustrates another example of a method of training a neural network to generate an image. A training apparatus 1000 may further include a first extractor $E_1$ and a second extractor $E_2$ that may extract a geometric feature from each of an input image or conditional information x 101 and a first synthesized image G(x) 120 that is an output image, in addition to a structure of the training apparatus 600 of FIG. 6. In a similar manner that geometry consistency is maintained between images, geometry consistency may also be maintained between features extracted from images.

FIG. 10 illustrates a process of generating an additional loss to maintain a geometry correspondence between geometric features, for example, $E_1(x)$ and $E_2(G(x))$, extracted from the images described above with reference to FIG. 6. In this example, the geometry correspondence may be determined based on shapes of the first extractor $E_1$ and the second extractor $E_2$. The extractors $E_1$ and $E_2$ may be, for example, a trained network, or a filtered network. The first extractor $E_1$ may be an extractor to extract a line, and the second extractor $E_2$ may be an extractor to extract a line or a vanishing point. In other words, the first extractor $E_1$ and the second extractor $E_2$ may be extractors to extract features of different domains, or extractors to extract features of the same domain.

In an example, geometry consistency may be strengthened using predefined features. In an example, the geometry correspondence may be applied between a first geometric feature $E_1(x)$ 1010 and a second geometric feature $E_2(G(x))$ 1030, or between a third geometric feature $E_1(T(x,d))$ 1050 and a fourth geometric feature $E_2(G(T(x,d)))$ 1070. In another example, the geometry correspondence may be used to additionally define a new geometry consistency loss between a transformed second geometric feature $T(E_2(G(x)),d)$ 1130 (shown in FIG. 11) and the fourth geometric feature $E_2(G(T(x,d)))$ 1070, which will be described below with reference to FIG. 11.

The training apparatus 1000 may extract the first geometric feature $E_1(x)$ 1010 from the conditional information x 101. Also, the training apparatus 1000 may extract the second geometric feature $E_2(G(x))$ 1030 from the first synthesized image G(x) 120. The training apparatus 1000 may generate a third loss for training an image generation neural network, based on a difference between the first geometric feature $E_1(x)$ 1010 and the second geometric feature $E_2(G(x))$ 1030. The third loss may correspond to a geometry correspondence loss that allows a geometry correspondence between the first geometric feature $E_1(x)$ 1010 and the second geometric feature $E_2(G(x))$ 1030 to be maintained.

Also, the training apparatus 1000 may extract the third geometric feature $E_1(T(x,d))$ 1050 from transformed conditional information T(x,d) 107. In addition, the training apparatus 1000 may extract the fourth geometric feature $E_2(G(T(x,d)))$ 1070 from a second synthesized image G(T(x,d)) 160. The training apparatus 1000 may generate a fourth loss for training an image generation neural network, based on a difference between the third geometric feature $E_1(T(x,d))$ 1050 and the fourth geometric feature $E_2(G(T(x,d)))$ 1070. The fourth loss may correspond to a geometry correspondence loss so that a geometry correspondence between the third geometric feature $E_1(T(x,d))$ 1050 and the fourth geometric feature $E_2(G(T(x,d)))$ 1070 may be maintained.

Figure 11:
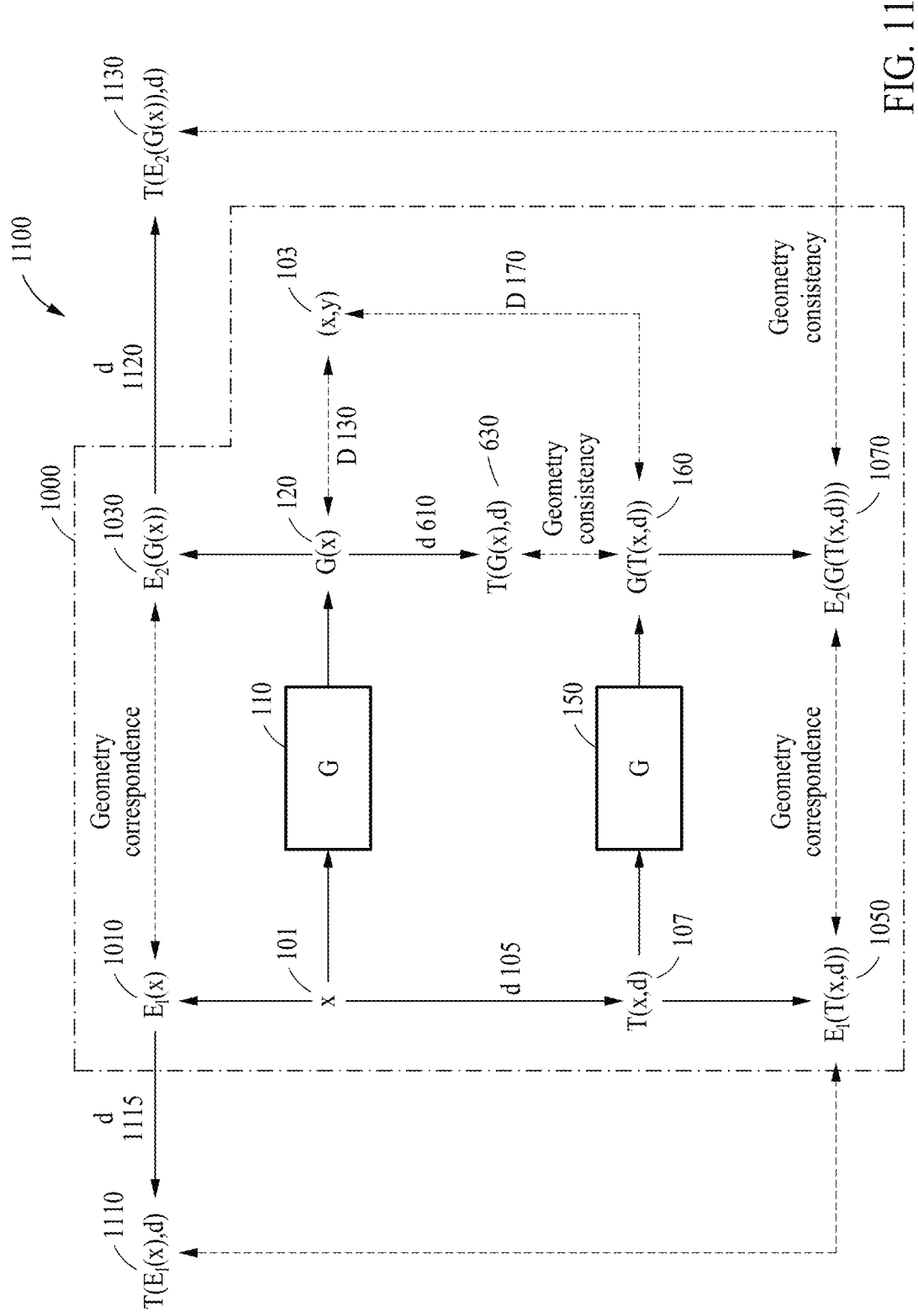

FIG. 11 illustrates another example of a method of training a neural network to generate an image.

FIG. 11 illustrates a process of generating a new geometry consistency loss that is additionally defined by a geometry correspondence between geometric features, for example, $E_1(x)$ and $E_2(G(x))$, extracted from images transformed based on a structure of the training apparatus 1000 described above with reference to FIG. 10.

A training apparatus 1100 may transform a second geometric feature $E_2(G(x))$ 1030 extracted from a first synthesized image G(x) 120 to the transformed second geometric feature $T(E_2(G(x)),d)$ 1130 based on depth information 1120. The training apparatus 1100 may generate a geometry consistency loss, that is, a fifth loss for training an image generation neural network, based on a difference between the transformed second geometric feature $T(E_2(G(x)),d)$ 1130 and the fourth geometric feature $E_2(G(T(x,d)))$ 1070 extracted from the second synthesized image G (T(x,d)) 160. The fifth loss may correspond to a geometry consistency loss that allows geometry consistency between the transformed second geometric feature $T(E_2(G(x)),d)$ 1130 and the fourth geometric feature $E_2(G(T(x,d)))$ 1070 to be maintained. In an example, the training apparatus 1100 may train an image generation neural network 110 by the fifth loss.

Also, the training apparatus 1100 may transform a first geometric feature $E_1(x)$ 1010 to a feature $T(E_1(x),d)$ 1110 based on depth information 1115. Also, geometry consistency between a third geometric feature $E_1(T(x,d))$ 1050 and the feature $T(E_1(x),d)$ 1110 may be allowed to be maintained.

The examples of FIGS. 10 and 11 may also be applicable to an example in which a geometry consistency loss is defined using $T^{-1}$ instead of using T. In another example, it is possible to define geometry consistency losses for an image generation neural network G, a first extractor $E_1$, and a second extractor $E_2$ by different combinations thereof using T or $T^{-1}$.

Figure 12:
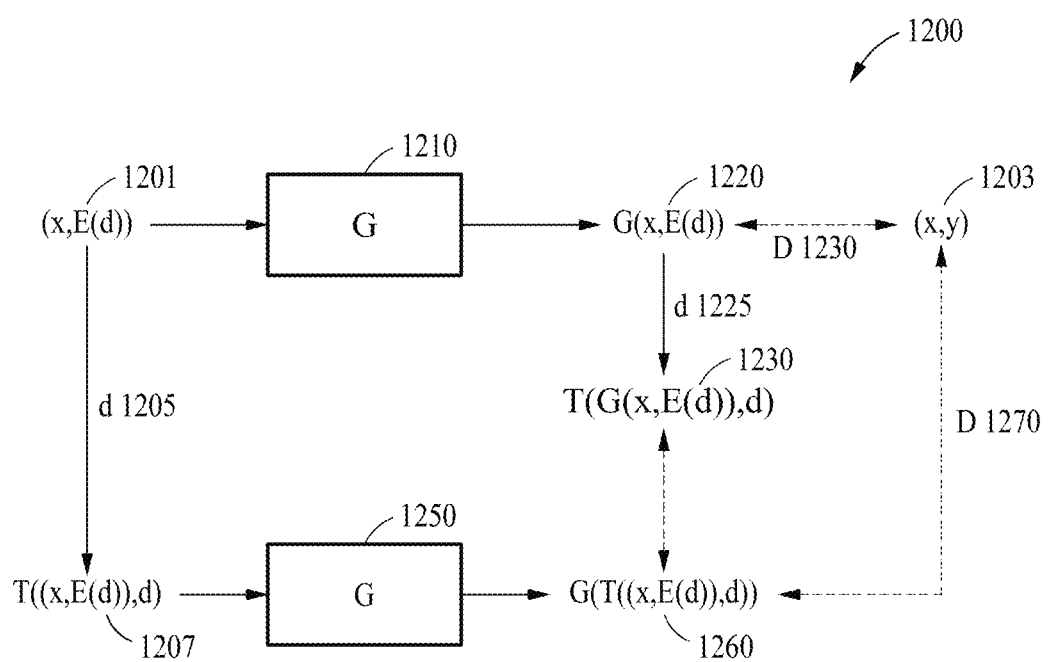

FIG. 12 illustrates another example of a method of training a neural network to generate an image. In FIG. 12, additional information based on depth information may be used as an input.

In an example, normal information may be obtained based on depth information 1205, and depth feature information E(d) obtained by extracting a discontinuity portion of the depth information 1205 and a discontinuity portion of the normal information, together with conditional information x, may be applied as an input (x, E(d)) 1201 to an image generation neural network 1210. In an example, the depth feature information E(d) may correspond to a compressive representation of geometric information that is conspicuous in an input image. For example, when the depth feature information E(d) together with the input image including the conditional information x are used as an input of the image generation neural network 1210, an image reflecting corresponding geometric information may be generated or transformed. However, in this example, the depth information 1205 may be used in an inference process of transforming a real image, in addition to a training process. The depth feature information E(d) may be defined by various methods in addition to the above-described method.

A training apparatus 1200 may extract the depth feature information E(d) from the depth information 1205. The training apparatus 1200 may apply the conditional information x and the depth feature information E(d) to the image generation neural network 1210 and may generate a first synthesized image G(x, E(d)) 1220 corresponding to the conditional information x and the depth feature information E(d) using the image generation neural network 1210.

The training apparatus 1200 may transform the conditional information x and the depth feature information E(d) to transformed conditional information T((x, E(d)), d) 1207 based on the depth information 1205. The training apparatus 1200 may generate a second synthesized image G(T((x, E(d)), d)) 1260 corresponding to the transformed conditional information T((x, E(d)), d) 1207 obtained through transformation by an image generation neural network 1250 based on image information.

The training apparatus 1200 may transform the first synthesized image G(x, E(d)) 1220 into a transformed image T(G(x, E(d)), d) 1230 based on a transformation relationship T of the conditional information based on depth information 1225. The depth information 1225 may be the same as the depth information 1205. The training apparatus 1200 may train an image generation neural network by comparing the transformed image T(G(x, E(d)), d) 1230 and the second synthesized image G(T((x, E(d)), d)) 1260. The training apparatus 1200 may generate a geometry consistency loss that allows a difference according to a comparison result between the transformed image T(G(x, E(d)), d) 1230 and the second synthesized image G(T((x, E(d)), d)) 1260 to be minimized. The training apparatus 1200 may train the image generation neural network 1210 by a corresponding loss.

The example of FIG. 12 may also be applicable to an example in which geometry consistency is defined using an inverse transformation relationship $T^{-1}$ instead of using the transformation relationship T, and also be applicable to an example in which a loss is calculated based on a geometry correspondence using additional extractors as shown in FIGS. 10 and 11.

Figure 13:
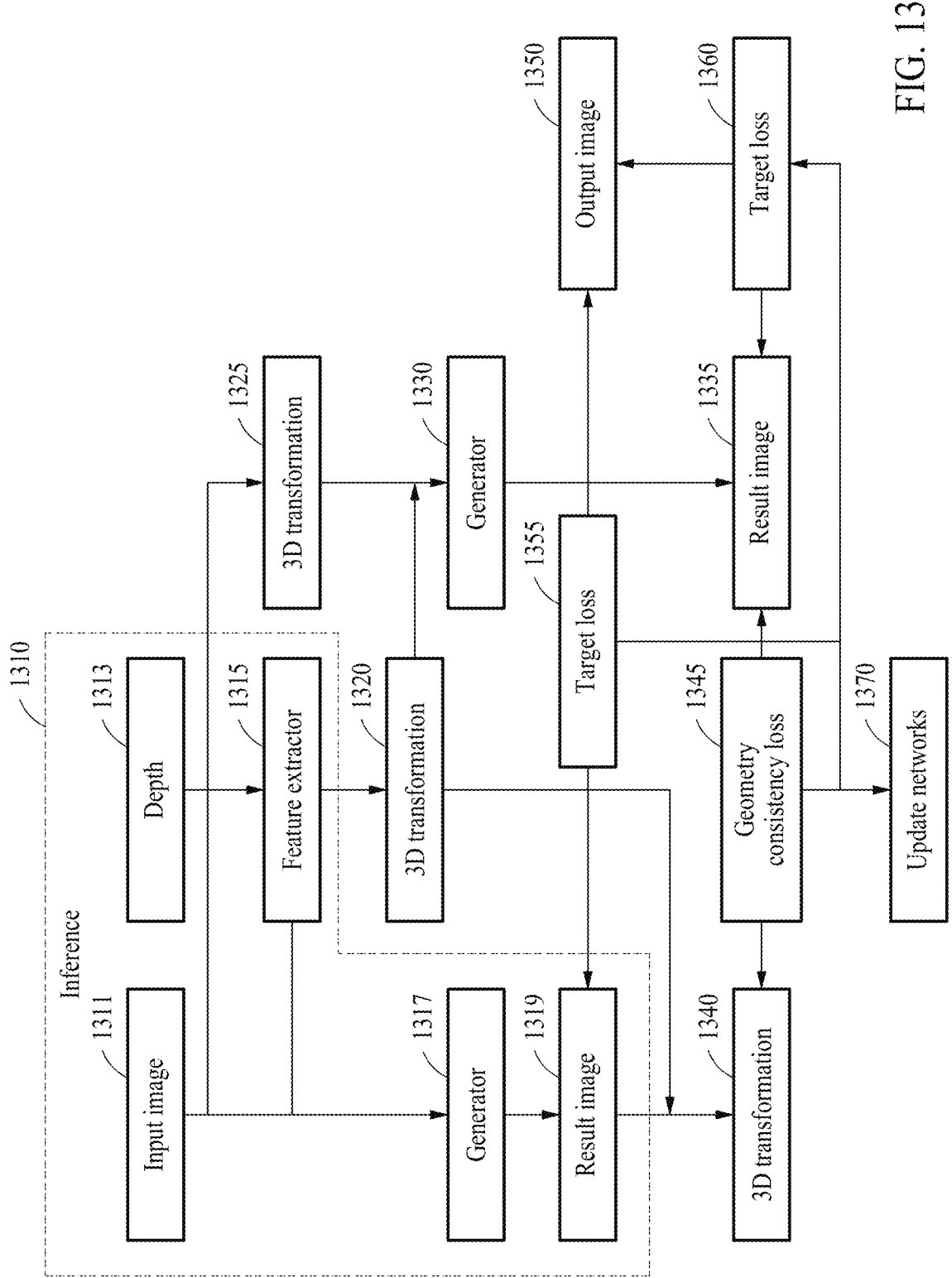

FIG. 13 illustrates an example of a configuration of a generation apparatus and a configuration of a training apparatus for training a neural network. The training apparatus of FIG. 13 may be a computing apparatus and may receive {Input x, Target y, Depth d} as input data. The training apparatus may train an image generation neural network Generator 1317 that transforms the input data and depth feature information E(d) that compressively represents geometric information conspicuous in an input image into an image of a target domain.

The training apparatus may extract the depth feature information E(d) from depth information 1313 using a feature extractor 1315. The feature extractor 1315 may obtain normal information from an input image 1311 based on the depth information 1313, and may extract a discontinuity portion of the depth information 1313 and a discontinuity portion of the normal information, to obtain the depth feature information E(d).

The training apparatus may apply the input image and the depth feature information E(d) extracted by the feature extractor 1315 to the image generation neural network 1317, and may generate a result image 1319, hereinafter, referred to as a "first synthesized image" 1319 corresponding to conditional information and depth feature information. The training apparatus may perform 3D transformation 1340 of the first synthesized image 1319.

The training apparatus may perform 3D transformation 1320 of the depth feature information E(d) extracted by the feature extractor 1315. Also, the training apparatus may perform 3D transformation 1325 of the input image 1311 based on the depth information 1313.

The training apparatus may apply the input image 1311 of which the 3D transformation 1325 is performed and the depth feature information E(d) of which the 3D transformation 1320 is performed to a second image generation neural network 1330, and may generate a result image 1335, hereinafter, referred to as a "second synthesized image" 1335.

The training apparatus may generate a geometry consistency loss 1345 based on a difference between the first synthesized image of which the 3D transformation 1340 is performed and the second synthesized image 1335.

In an example, the training apparatus may calculate a target loss 1355 that is based on a difference between the first synthesized image 1319 and image information y of an output image 1350, and/or a target loss 1360 between the second synthesized image 1335 and the output image 1350.

The training apparatus may train the image generation neural network 1317 by updating the image generation neural network 1317 by a weighted sum that allows a sum of the geometry consistency loss 1345, the target loss 1355 and/or the target loss 1360 to be minimized.

The image generation neural network 1317 trained through the above-described process may be used in a generation apparatus 1310 that transforms a real image. For example, input data in a form of {Input x, Depth d} may be applied to the image generation neural network 1317. When the image generation neural network 1317 is used in the generation apparatus 1310 that performs an inference process of transforming an image, the image generation neural network 1317 may generate the first synthesized image 1319 by maintaining the conditional information and geometric information included in depth feature information and transforming image information based on the conditional information and the depth feature information.

Figure 14:
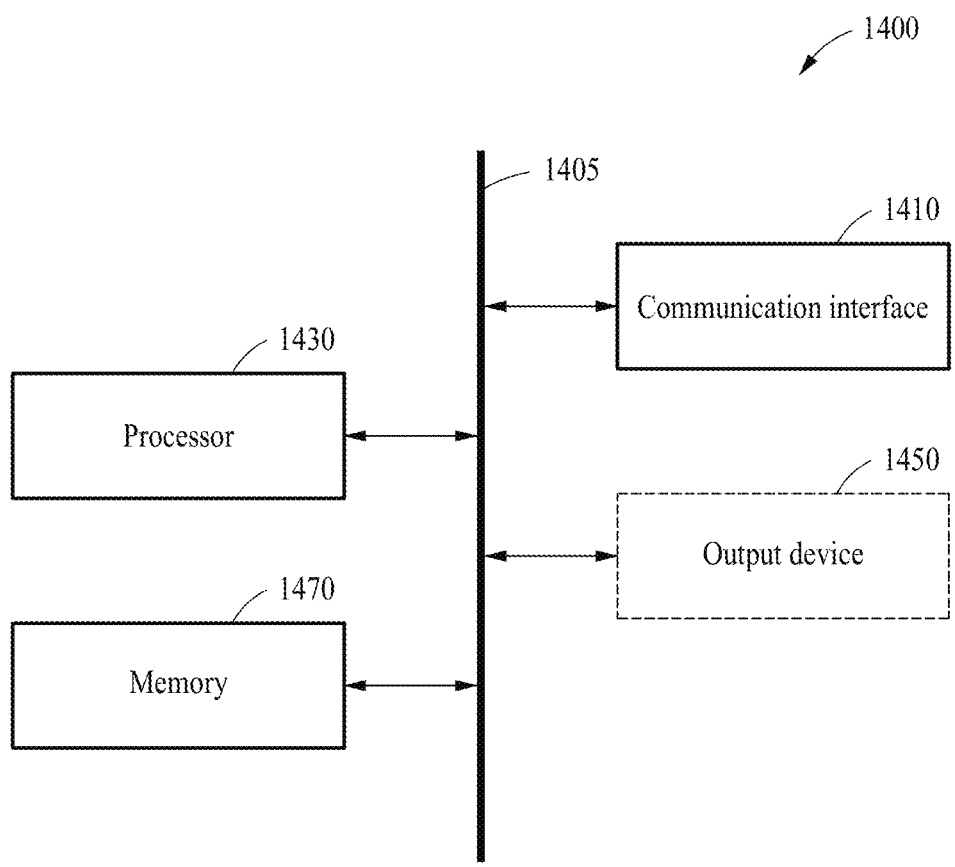
FIG. 14 illustrates an example of an apparatus for generating an image.

FIG. 14 illustrates an example of a generation apparatus 1400. Referring to FIG. 14, the generation apparatus 1400 may include a communication interface 1410, a processor 1430, an output device 1450, and a memory 1470. The communication interface 1410, the processor 1430, the output device 1450, and the memory 1470 may be connected to each other via a communication bus 1405.

The communication interface 1410 may receive input data that includes conditional information and image information. The conditional information may include, for example, structure information of any one or any combination of semantic information, edge information, and skeleton information. Also, the communication interface 1410 may receive depth information corresponding to the conditional information.

In an example, the processor 1430 may generate a synthesized image by applying the input data to an image generation neural network that maintains geometric information included in the image information and that transforms the remaining image information based on the conditional information.

For example, when the depth information corresponding to the conditional information is received via the communication interface 1410, the processor 1430 may generate a synthesized image by applying the input data and feature information extracted from the depth information to the image generation neural network.

However, an operation of the processor 1430 is not limited to the above-described operations, and the processor 1430 may perform at least one of the operations described above with reference to FIGS. 1 through 13 together with the above-described operation.

The processor 1430 may be a hardware-implemented image generating apparatus having a circuit that is physically structured to execute desired operations. For example, the desired operations may include code or instructions included in a program. The hardware-implemented generation apparatus may include, for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 1430 is given below.

The processor 1430 may execute a program and may control the generation apparatus 1400. Code of the program executed by the processor 1430 may be stored in the memory 1470.

The output device 1450 may output the synthesized image generated by the processor 1430. The output device 1450 may include, for example, a display device, however, examples are not limited thereto. For example, the output device 1450 may include an output interface and may output the synthesized image generated by the processor 1430 via the output interface to an outside of the generation apparatus 1400.

The memory 1470 may store the input data received by the communication interface 1410. Also, the memory 1470 may store the geometric information included in the image information analyzed by the processor 1430 and/or the synthesized image generated by the processor 1430.

The memory 1470 may be implemented as a volatile memory device or a non-volatile memory device. The volatile memory device may be implemented as dynamic random-access memory (DRAM), static random-access memory (SRAM), thyristor RAM (T-RAM), zero capacitor RAM (Z-RAM), or twin transistor RAM (TTRAM).

The non-volatile memory may be implemented as electrically erasable programmable read-only memory (EEPROM), a flash memory, magnetic ram (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), a holographic memory, molecular electronic memory device, or insulator resistance change memory. Further description of the memory 1470 is given below.

The embodiments described above disclose an image generation neural network that may be trained based on an adversarial loss, together with a geometry consistency loss that minimizes a difference between transformed images, so as to generate a result image that maintains a corresponding geometric structure even though a view varies depending on geometric conditions that may be inferred from an input image. In addition, by applying the above-described concept of the geometry consistency to training of the image generation neural network, the image generation neural network may be trained so that a single input image with many straight lines and clear perspective may be allowed to be transformed consistently even if a view changes.

The training apparatus 600, generator, 713, generator 735, generator, 913, generator 935, generator 1317, generator 1330, generation apparatus 710, generation apparatus 910, generation apparatus 1310, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of generating an image and the method of training a neural network or generating an image. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
   receiving input data comprising conditional information and image information, wherein the image information includes geometric information;
   receiving depth information corresponding to the conditional information;
   extracting feature information from the depth information;
   generating a synthesized image based on the conditional information by applying the input data and the feature information to an image generation neural network, the image generation neural network is configured to:
      maintain the geometric information of the image information; and
      transform, based on the conditional information, first remaining image information of the image information to second remaining image information; and
   outputting the synthesized image.

2. The method of claim 1, wherein the image generation neural network is trained by a first loss generated based on a comparison between a first synthesized image that corresponds to the conditional information and is transformed based on a transformation relationship between the conditional information and a second synthesized image, the second synthesized image corresponds to the conditional information and is transformed based on depth information corresponding to the conditional information.

3. The method of claim 1, wherein the conditional information comprises structure information of any one or any combination of semantic information, edge information, and skeleton information.

4. The method of claim 1, further comprising:
   receiving depth information corresponding to the conditional information;
   generating a first synthesized image corresponding to the conditional information by the image generation neural network based on the image information;
   transforming the conditional information based on the depth information;
   generating a second synthesized image corresponding to the transformed conditional information by the image generation neural network based on the image information; and
   training the image generation neural network by comparing the first synthesized image and the second synthesized image based on a transformation relationship of the conditional information.

5. A non-transitory computer-readable storage medium storing instructions that, when executed by a processor, cause the processor to execute a method of generating an image, the method comprising:
   receiving input data comprising conditional information and image information, wherein the image information includes geometric information;

receiving depth information corresponding to the conditional information;
extracting feature information from the depth information;
generating a synthesized image based on the conditional information by applying the input data and the feature information to an image generation neural network, the image generation neural network is configured to:
maintain the geometric information of the image information; and
transform, based on the conditional information, first remaining image information of the image information to second remaining image information; and
outputting the synthesized image.

6. A computing apparatus, the apparatus comprising:
a communication circuit configured to:
receive input data including conditional information and image information, wherein the image information includes geometric information; and
receive depth information corresponding to the conditional information;
a processor configured to:
extract feature information from the depth information; and
generate a synthesized image based on the conditional information by applying the input data and the feature information to an image generation neural network, wherein the image generation neural network is configured to:
maintain the geometric information of the image information; and
transform, based on the conditional information, first remaining image information of the image information to second remaining image information; and
an output circuit configured to output the synthesized image.

7. A processor-implemented method, the method comprising:
receiving training data comprising conditional information and image information;
receiving depth information corresponding to the conditional information;
generating a first synthesized image corresponding to the conditional information by an image generation neural network based on the image information;
transforming the conditional information based on the depth information;
generating a second synthesized image corresponding to the transformed conditional information by the image generation neural network based on the image information; and
training the image generation neural network by comparing the first synthesized image and the second synthesized image based on a transformation relationship of the conditional information.

8. The method of claim 7, wherein the training of the image generation neural network comprises:
transforming the first synthesized image based on the transformation relationship of the conditional information; and
generating a first loss based on a first difference between the transformed first synthesized image and the second synthesized image.

9. The method of claim 7, wherein the generating of first loss comprises generating the first loss to maintain a geometry consistency between the transformed first synthesized image and the second synthesized image.

10. The method of claim 7, wherein the training of the image generation neural network comprises:
inversely transforming the second synthesized image based on the transformation relationship of the conditional information; and
generating a second loss based on a second difference between the inversely transformed second synthesized image and the first synthesized image.

11. The method of claim 10, wherein the generating of the second loss comprises generating the second loss to maintain a geometry consistency between the inversely transformed second synthesized image and the first synthesized image.

12. The method of claim 7, wherein the transforming of the conditional information comprises:
unprojecting the training data to a three-dimensional (3D) space by a transformation relationship based on the depth information; and
transforming the conditional information by projecting the unprojected training data to a viewpoint.

13. The method of claim 7, wherein the conditional information comprises structure information of any one or any combination of semantic information, edge information, and skeleton information.

14. The method of claim 7, further comprising:
extracting a first geometric feature from the conditional information; and
extracting a second geometric feature from the first synthesized image,
wherein the training of the image generation neural network further comprises generating a third loss for training the image generation neural network, based on a difference between the first geometric feature and the second geometric feature.

15. The method of claim 7, further comprising:
extracting a third geometric feature from the transformed conditional information; and
extracting a fourth geometric feature from the second synthesized image,
wherein the training of the image generation neural network further comprises generating a fourth loss for training the image generation neural network, based on a difference between the third geometric feature and the fourth geometric feature.

16. The method of claim 15, further comprising:
transforming a second geometric feature extracted from the first synthesized image based on the depth information,
wherein the training of the image generation neural network comprises generating a fifth loss for training the image generation neural network, based on a difference between the transformed second geometric feature and a fourth geometric feature extracted from the second synthesized image.

17. The method of claim 7, further comprising:
extracting depth feature information from the depth information,
wherein the generating of the first synthesized image further comprises generating the first synthesized image corresponding to the depth feature information and the conditional information by the image generation neural network based on the image information.

18. The method of claim 17, wherein the transforming of the conditional information comprises transforming the conditional information and the depth feature information based on the depth information.

19. The method of claim 18, wherein the generating of the second synthesized image further comprises generating the second synthesized image corresponding to the transformed conditional information and the transformed depth feature information by the image generation neural network based on the image information.

20. The method of claim 7, further comprising any one or any combination of:
training an image discrimination neural network to estimate the first synthesized image as a fake image;
training the image discrimination neural network to estimate the second synthesized image as the fake image; and
training the image discrimination neural network to estimate the image information as a real image.

21. The method of claim 7, further comprising:
generating a synthesized image by applying the input data to the trained image generation neural network; and
outputting the synthesized image.

22. A processor-implemented method, the method comprising:
receiving training data comprising image information, conditional information, and depth information corresponding to the conditional information;
extracting depth feature information from the depth information;
generating a first synthesized image corresponding to the depth feature information and the conditional information by the image generation neural network based on the image information;
transforming the conditional information and the depth feature information based on the depth information;
generating a second synthesized image corresponding to the transformed conditional information and the transformed depth feature information by the image generation neural network based on the image information; and
training the image generation neural network by comparing the first synthesized image and the second synthesized image based on a transformation relationship of the conditional information and the depth information.

23. The method of claim 22, wherein the training of the image generation neural network comprises:
transforming the first synthesized image based on the transformation relationship; and
training the image generation neural network to minimize a difference between the transformed first synthesized image and the second synthesized image.

24. The method of claim 22, wherein the depth feature information is based on extracting a discontinuity portion of the depth information and a discontinuity portion of the normal information.

* * * * *